J. BAKER, Jr.
SHOCK ABSORBER.
APPLICATION FILED JUNE 12, 1913.
1,097,286.
Patented May 19, 1914.
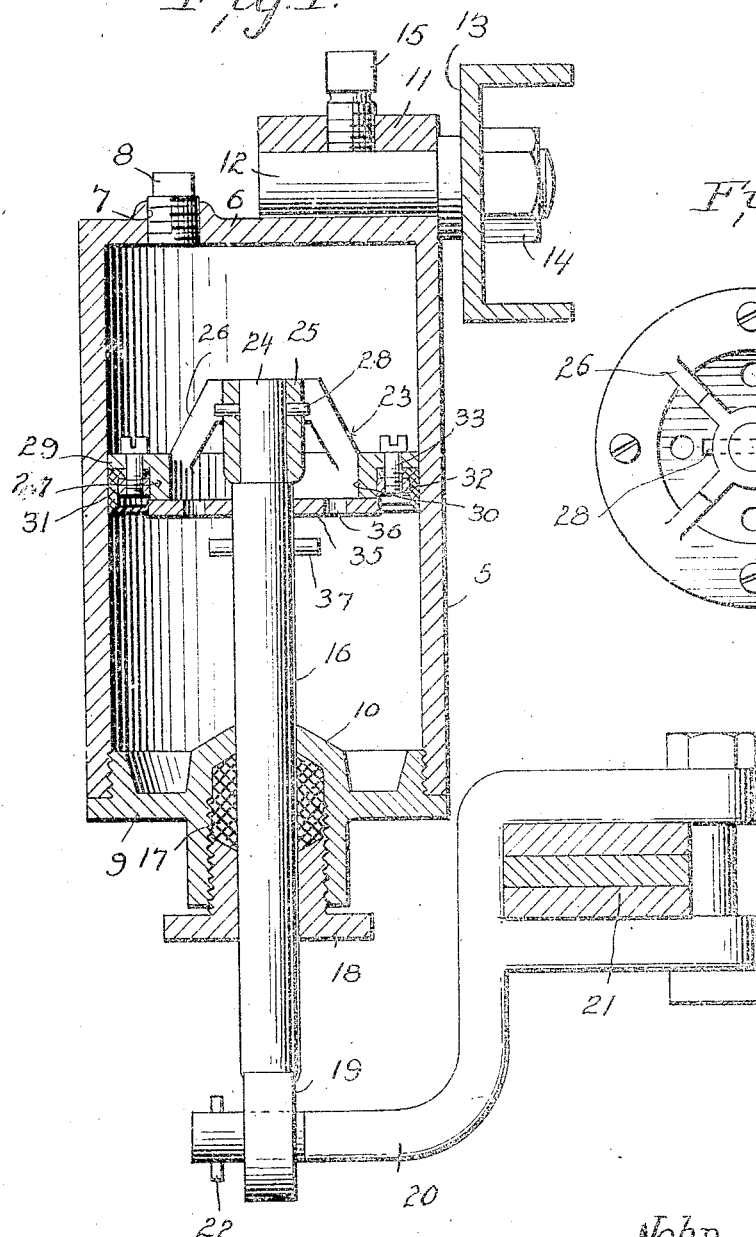
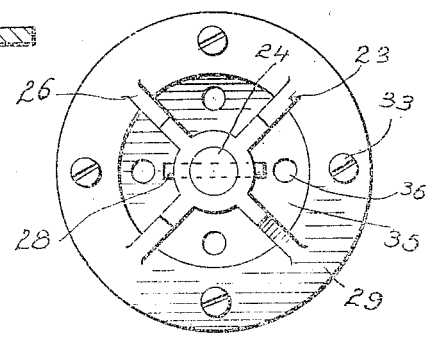
Witnesses
R. N. Jones.
R. M. Smith.
Inventor
John Baker Jr.
By Randolph Jr.
Attorney.

UNITED STATES PATENT OFFICE.

JOHN BAKER, JR., OF LOS ANGELES, CALIFORNIA, ASSIGNOR OF ONE-HALF TO
WALTER P. SHAW, OF LOS ANGELES, CALIFORNIA.

SHOCK-ABSORBER.

1,097,286.  Specification of Letters Patent.  Patented May 19, 1914.

Application filed June 12, 1913. Serial No. 773,293.

*To all whom it may concern:*

Be it known that I, JOHN BAKER, Jr., a citizen of the United States, residing at Los Angeles, in the county of Los Angeles and State of California, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers of the cylinder and piston type for use upon vehicles and is designed more particularly for use in connection with automobiles.

One of the objects of the invention resides in the provision of a shock absorber of this nature, which shall be of extremely simple construction, very efficient, and which will not interfere with the cushioning properties of the springs of a vehicle.

Another object of the invention is to provide a device of this nature which shall be very effective in controlling the recoil of the springs, since it is the return movement of a vehicle body which most disturbs the occupants and causes the greatest strain upon a vehicle.

Another and more specific object of the invention resides in the provision of a shock absorber of the cylinder and piston type in which the piston head is of a peculiar construction so as to permit of the air or liquid within the cylinder flowing rapidly through said head when the valve is open.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a longitudinal sectional view through my improved shock absorber, parts thereof being shown in elevation, and, Fig. 2 is a top plan view of the piston.

Referring in detail to the drawings by numerals, 5 designates a cylinder or dash pot closed at its upper end by the integrally formed wall or head 6 formed with a filling opening 7 which is closed by the screw plug 8, and at its lower end by a removable head 9 formed with the stuffing box 10. A socket or sleeve 11 is formed integrally upon the head 6 and receives a bolt 12 which is attached to the vehicle frame 13, by means of a nut 14. A locking screw 15 is threaded through the sleeve into engagement with the bolt 12.

A piston rod 16 slides through the stuffing box 10 in which is retained the packing 17 by means of a packing gland 18. The lower end of the piston rod is enlarged, as indicated at 19, and transversely apertured to permit the passage of the bracket arm 20. This arm is bolted to the springs 21 and carries a pin 22 which prevents the piston rod becoming disengaged.

A peculiarly constructed piston head, generally designated 23, is secured to the reduced inner extremity 24 of the piston rod. The head comprises a spider formed by the sleeve 25 and downwardly and outwardly projecting arms 26, and an annular rim 27 which is carried by the extremities of the spider arms. The sleeve 25 surrounds the reduced portion 24 of the piston rod and is secured thereto by the pin 28. The arms 26, here shown as four in number, extend from the periphery of the sleeve adjacent its upper end and are secured to the horizontal wall 29 and the vertical wall 27 of the angle iron rim. A circular strip of packing 31 is secured to the rim 27 by means of the ring 32 and screw bolts 33, the latter passing through the wall 29 of the rim and threading into the locking ring 32. A disk valve 35 having the relatively small ports 36, is slidable upon the piston rod 15, and is for the purpose of controlling the flow of liquid through the skeleton piston head. A pin 37 extends through the piston rod below the valve and limits the downward movement of the latter but permits it to drop away from engagement with the rim of the piston.

Having described the construction of my shock absorber, I will now explain its operation. When the vehicle encounters an elevation or depression in the roadway, the initial movement of the piston and cylinder is toward each other and it is desirable to leave this movement unrestricted except by the action of the springs. It will be evident that as the piston head moves toward the top of the cylinder the contents of the cylinder may flow freely through the piston head, the valve disk at this time resting upon the pin 37. Especial attention is directed to the fact that the piston head being of a skeleton construction permits a large volume of liquid to flow rapidly therethrough so that the utility of the springs is not affected by the upward movement of the piston. When the recoil begins the piston head moves toward the head 9 of the piston and it is this movement which my invention is designed to control. If the movement is gradual, the valve will remain open but as soon as the velocity of the piston head becomes sufficiently great, the valve is forced against the rim 27 and leaves only the relatively small opening 36 open for the liquid to flow through. It will be seen that small vibrations of the vehicle are permitted without hindrance from the shock absorber but that a certain rebound is checked.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

In a device of the character described, a cylinder, a piston rod, a piston head secured to said rod and comprising a sleeve surrounding the rod, a plurality of arms inclined to said sleeve, and a rim formed upon the outer end of the arms, said rim being of angle iron construction having one wall engaging the inner surface of the cylinder and lying in a plane parallel to the heads of the cylinder, and a second wall spaced from the inner surface of the cylinder, a disk valve slidable upon the piston rod, means for limiting the movement of the valve away from said piston head, the valve being adapted to seat against the second mentioned wall of the piston rim and being formed with a plurality of restricted ports.

In testimony whereof I affix my signature in presence of two witnesses.

JOHN BAKER, Jr.

Witnesses:
CHAS. L. CHANDLER,
EDGAR F. HUGHES.